No. 630,187. Patented Aug. 1, 1899.
B. CUNNINGHAM.
FRUIT EVAPORATOR.
(Application filed Apr. 11, 1898.)
(No Model.) 2 Sheets—Sheet 1.
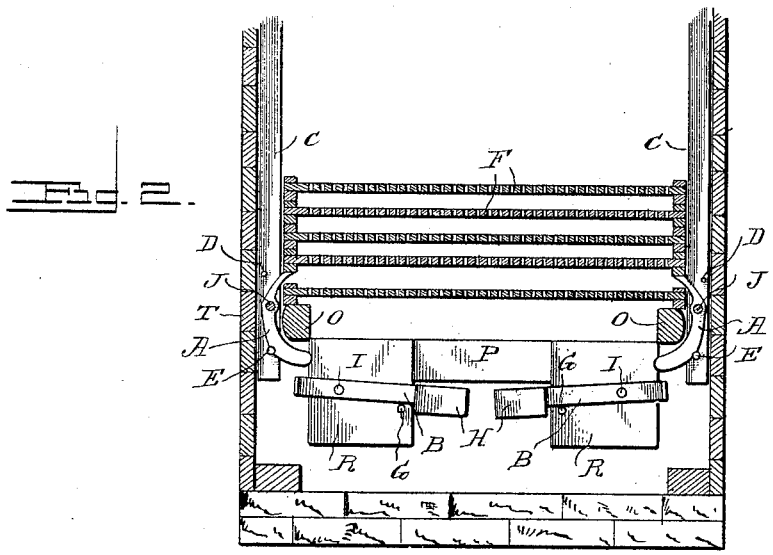
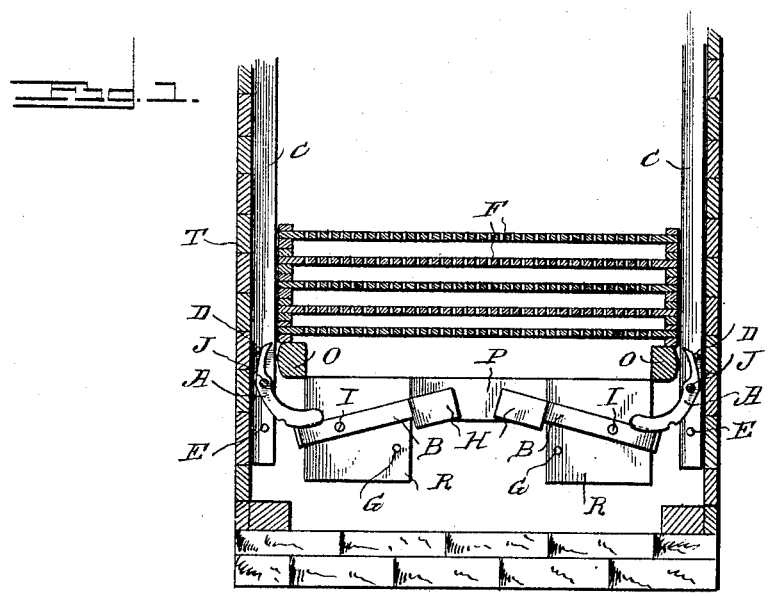
Witnesses
E. K. Stewart
N. F. Riley
Bruce Cunningham Inventor
By W'r's Attorneys,
C. A. Snow & Co.

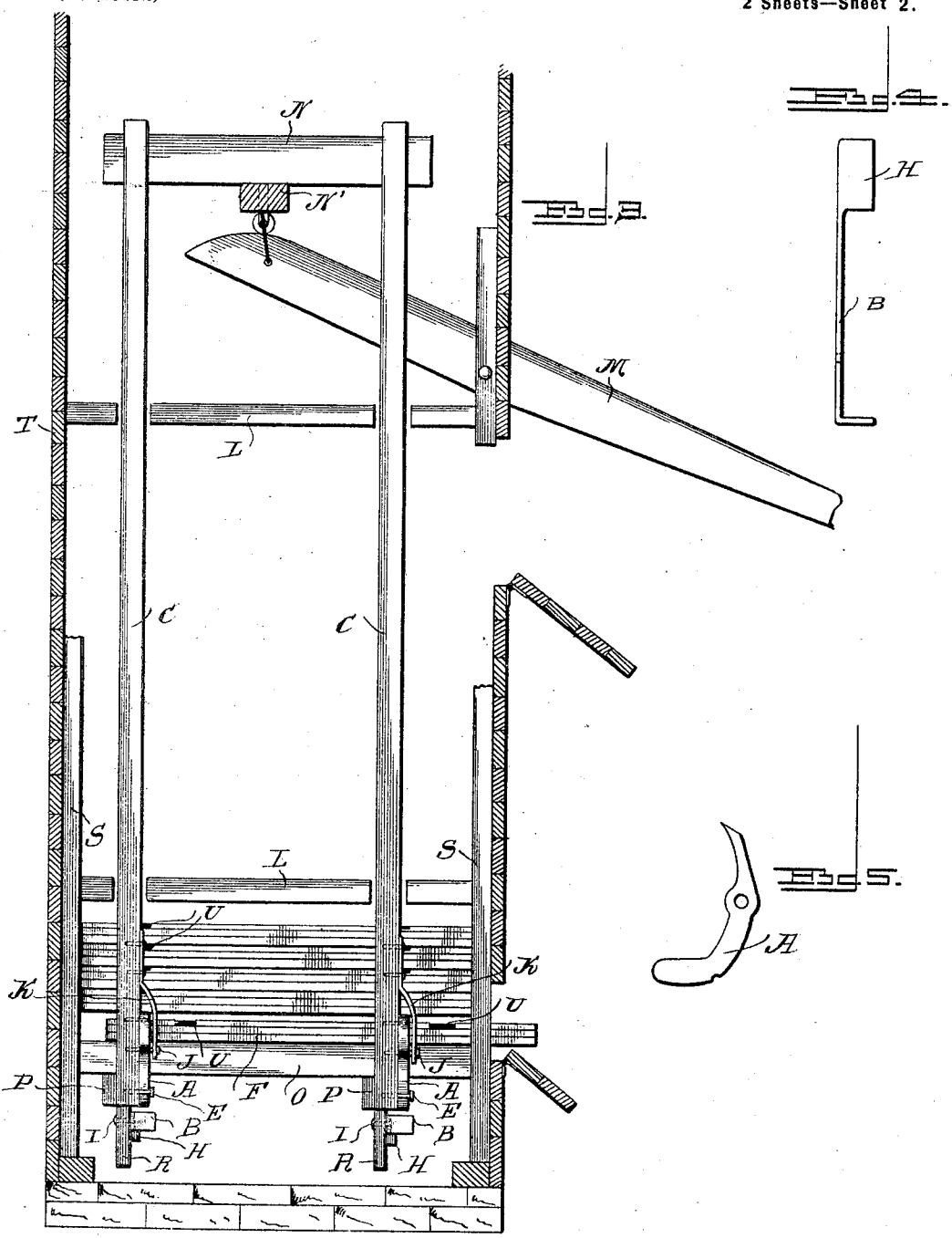

UNITED STATES PATENT OFFICE.

BRUCE CUNNINGHAM, OF LIBERTY, OREGON.

FRUIT-EVAPORATOR.

SPECIFICATION forming part of Letters Patent No. 630,187, dated August 1, 1899.

Application filed April 11, 1898. Serial No. 677,224. (No model.)

*To all whom it may concern:*

Be it known that I, BRUCE CUNNINGHAM, a citizen of the United States, residing at Liberty, in the county of Marion and State of Oregon, have invented a new and useful Fruit-Evaporating Machine, of which the following is a specification.

The invention relates to improvements in fruit-evaporators.

The object of the present invention is to improve the construction of that class of fruit-evaporators in which the trays of fruit are placed in a stack, each tray resting upon the one immediately beneath it, and to start fruit at the top or coolest part of the evaporator to prevent dripping and consequent waste and to finish the fruit at the bottom or warmest part of the evaporator with the least liability of burning or scorching it.

A further object of the invention is to produce the best quality of evaporated fruit with the least labor and expense and to enable the fruit to possess the qualities of sweetness and heaviness to a maximum degree.

The invention consists in the construction and novel combination and arrangement of parts, as hereinafter fully described, illustrated in the accompanying drawings, and pointed out in the claims hereto appended.

In the drawings, Figure 1 is a front elevation of a fruit-evaporator, the tray-lifting mechanism being lowered. Fig. 2 is a similar view, the tray-lifting mechanism being elevated. Fig. 3 is a side elevation, the mechanism being arranged as shown in Fig. 2, the lowermost tray being partially removed. Fig. 4 is a detail view of the weighted trip-lever. Fig. 5 is a detail view of the dog.

Like letters of reference designate corresponding parts in all the figures of the drawings.

T designates a casing for a stack of trays F, and this casing, which forms the framework of the evaporator, is provided on its interior with corner uprights or studding S, partially shown in Fig. 3 of the accompanying drawings. The uprights or studding S, which are located at the sides of the trays, are about one-eighth of an inch thicker than lifting-bars C, in order to prevent the trays from binding the lifting-bars C against the casing T. The lifting-bars are operated by a lever M, fulcrumed between its ends on the casing and having its inner end located beneath and connected with a horizontal bar, which has its terminals secured to the lower edges of cross-bars N. The cross-bars N, which are secured to the upper ends of the lifting-bars, form with the same and the horizontal bar N' a lifting-frame, which is raised and lowered by the action of the operating-lever M. The vertical bars C of the lifting-frame are held in position by guides L and by ledges O, the latter being arranged near the base of the frame and being adapted to support the trays when the lifting mechanism is in its lowermost position or down.

The trays F have a depth of two and three-fourths inches, and lifts or bars C have a vertical movement of four and three-fourths inches in order to allow the points of dogs A, which are pivotally mounted on the lifts or bars C at J, to travel one inch below and one inch above the lowermost tray of the stack. The trays are introduced into the evaporator at the top to start the fruit at the coolest part of the machine, and thereby prevent dripping and consequent waste, and in order to remove the lowermost tray the lifting-frame is raised by the operating-lever M to the position shown in Fig. 2, causing the points of the dog to engage the tray next to the bottom of the stack and lift those above the bottom tray to free the latter and enable it to be withdrawn, as indicated in Fig. 3 of the accompanying drawings. After removing the bottom tray the lifts or bars C are lowered until the trays F rest upon the ledges O.

The upper ends of the dogs are pointed, and their lower arms or portions are longer than the upper arms and are weighted and curved inward, so as to be engaged by weighted trip-levers B, whereby the upper ends of the dogs are thrown outward and are caused to clear the lowermost tray in the upward movement of the lifting-frame. The outward movement of the upper ends of the dogs is limited by stops D of the lifts or bars C and the inward movement of the same is limited by stops E, mounted on the lifts or bars C, near the lower ends thereof, and arranged to be engaged by the lower arms of the dogs, which are provided at their outer edges with notches. The trip-levers B are fulcrumed between their ends at I on hangers R and are provided at their inner ends with weights H, the downward movement of the weighted inner portions being limited by stops G of the hangers R. The weight of the stack resting upon the engaging ends of the dogs is sufficient to hold the weighted ends of the trip-levers elevated and prevent the same from throwing the dogs outward from beneath the lowermost tray until the stack is deposited on the ledges O. The ledges O are recessed at their rear faces to permit the dogs to deposit the lowermost tray upon the said ledges and disengage the same freely, and the trays are recessed at the upper edges of the opposite sides at U to permit the dogs to engage the tray next to the bottom of the stack. The dogs on being released from the weight of the stack on reaching the ledges O are thrown outward by the trips B and held against the stops D, and when the lifts or bars are again raised the said trips B follow the dogs and maintain them in the position shown in Fig. 1 until their points are two inches above the ledges, when the trips B will be arrested by the stops G to permit the engaging ends of the dogs to swing inward under the tray next to the bottom of the stack. The dogs in their downward movement engage the trips when their upper ends are at a point two inches above the ledges.

Four lifts or bars are preferably provided for each stack and a pair is arranged on each side of the same, the bars or lifts being located equidistant of the ends of the trays, the dogs being located equal distances from the said ends. The outer ends of the pivots J, upon which the dogs are mounted, are supported by straps K, (see Fig. 3,) and strips P are provided for supporting the ledges.

The guides L, which are of a thickness equal to the lifts or bars, form a cut-off to prevent the hot air from passing upward at the edges of the trays and compel the heated air to pass through the fruit. The air after passing through the fruit and becoming charged with moisture is permitted to escape at the top of the casing of the stack. There are twenty-four trays in the stack, and it is designed to place a number of these stacks side by side and with their backs together over one large furnace or heating-chamber.

The invention has the following advantages: The lifting mechanism, which is exceedingly simple and inexpensive in construction, is capable of enabling the trays to descend gradually through the stack from the coolest to the warmest place and by gradually heating the fruit and slowly bringing it to the bottom of the stack, where the heat is the greatest, the evaporation is gradual and dripping and consequent waste are prevented. This treatment of the fruit enables the best quality of evaporated fruit to be obtained with the least labor and expense, and the qualities of sweetness and heaviness are produced to a maximum extent.

Changes in the form, proportion, and minor details of construction may be resorted to without departing from the spirit or sacrificing any of the advantages of this invention.

What is claimed is—

1. In an apparatus of the class described, the combination with the casing and a stack of trays, of vertically-movable lift-bars arranged within the casing, dogs pivotally mounted on the lift-bars and provided with upper engaging points adapted to engage with the tray next above the bottom tray, said dogs being provided below their pivots with lower weighted ends which serve to automatically oscillate the dogs in one direction, and means, set into action by the movement of the lift-bars, for oscillating the dogs in the opposite direction, substantially as set forth.

2. In a device of the class described, the combination with a lift, of a dog pivotally mounted thereon, and having one end arranged to engage a tray, and a weighted trip engaging the other end of the dog and adapted to cause the same to clear the bottom tray of a stack, when the lift is raised, substantially as described.

3. In a device of the class described, the combination with a lift, of a pivoted dog carried by the lift and having its upper end arranged to engage a tray, the lower end of the dog being curved, a weighted trip-lever engaging the curved end of the dog and arranged to cause the engaging end of the dog to clear the lowermost tray, and stops for limiting the movement of the dog and the trip-lever, substantially as described.

BRUCE CUNNINGHAM.

Witnesses:
H. A. JOHNSON,
FRED HURST.